W. C. KANTNER.
SOUND BOX.
APPLICATION FILED JUNE 25, 1920.
1,394,427.
Patented Oct. 18, 1921.
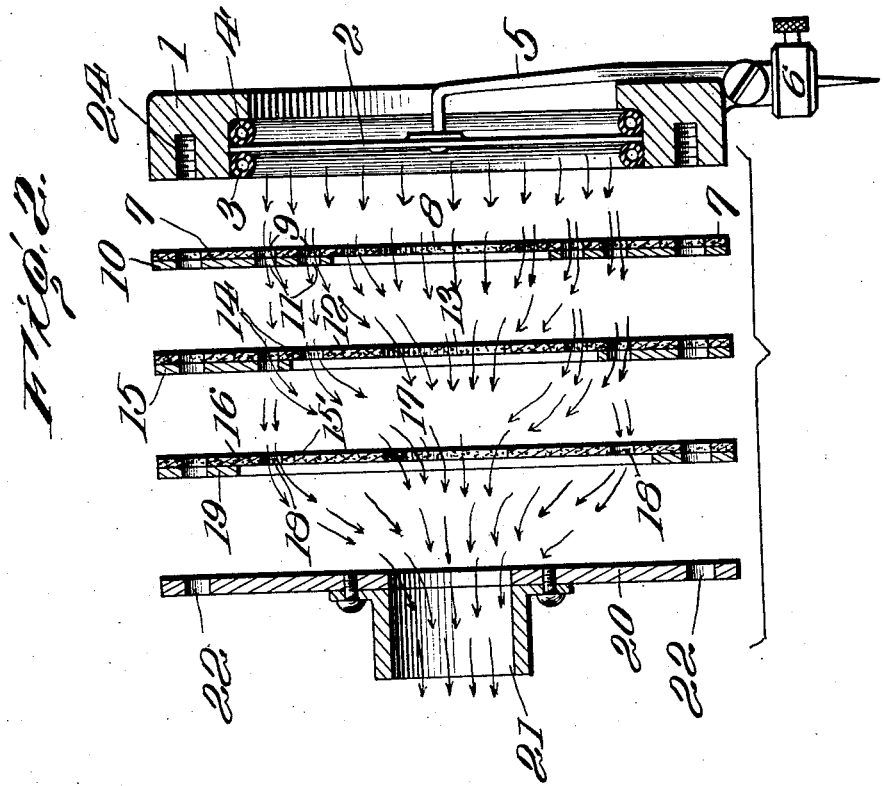
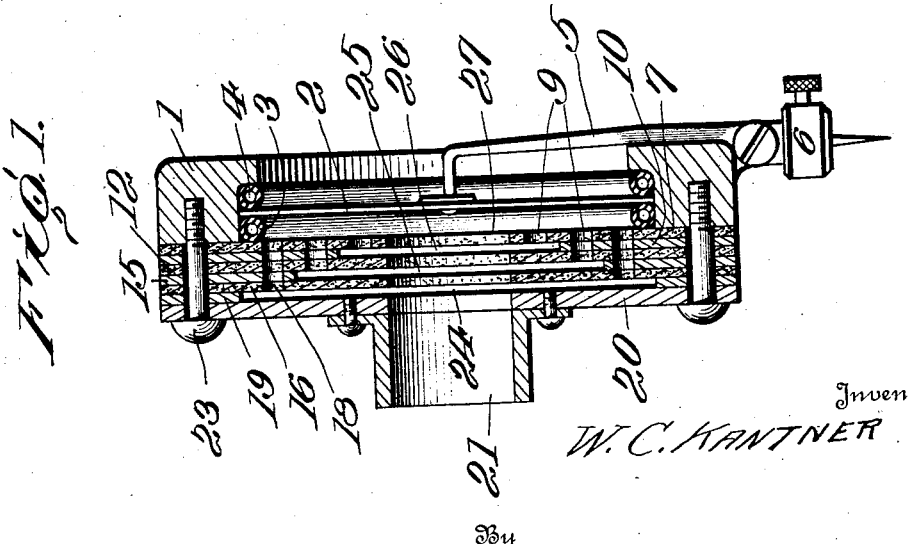
Inventor
W. C. KANTNER
By
Attorney

UNITED STATES PATENT OFFICE.

WASHINGTON C. KANTNER, OF READING, PENNSYLVANIA.

SOUND-BOX.

1,394,427.   Specification of Letters Patent.   Patented Oct. 18, 1921.

Application filed June 25, 1920. Serial No. 391,573.

*To all whom it may concern:*

Be it known that I, WASHINGTON C. KANTNER, a citizen of the United States, residing at Reading, in the county of Berks and State of Pennsylvania, have invented certain new and useful Improvements in Sound-Boxes, of which the following is a specification, reference being had therein to the accompanying drawing.

This invention relates to certain new and useful improvements in sound boxes for sound reproducing machines, the object being to provide a sound box which is so constructed that the sound waves are broken up or separated so as to eliminate the shrillness, harshness and ear piercing effects whereby sweet, melodious strains can be produced.

A still further object of the invention is to provide a sound box with a series of chambers disposed between the vibratory disk and the outlet in order to cause the sound waves of the outer portion of the vibratory disk to travel through the openings of the walls of the chambers in such a manner that the waves produced by the vibratory diaphragm are broken up before they are transmitted to the horn.

A still further object of the invention is to provide a construction which can be readily applied to the ordinary construction of sound box now in use by simply employing screws of a greater length.

Other and further objects and advantages of the invention will be hereinafter set forth and the novel features thereof defined by the appended claims.

In the drawings,

Figure 1 is a longitudinal section through a sound box constructed in accordance with my invention; and Fig. 2 is a longitudinal section showing the parts separated showing the path of travel of the sound waves.

In carrying out my invention I employ a cylindrical sound box 1 preferably of the ordinary construction now in use which is provided with a mica diaphragm 2 held between rubber washers 3 and 4 and provided with a needle bar 5 which is connected to a needle socket 6 in the ordinary manner. Arranged against the open end of the sound box and resting on the rubber washer 3 employed for holding the mica diaphragm is a fiber disk 7 which is provided with a central opening 8 and a series of annularly concentrically arranged openings 9 herein shown three in number. A washer of pasteboard or the like 10 is placed against the fiber disk 7 having two rows of annularly concentrically arranged openings 11 registering with the outer two rows of the openings 9 of the disk 7. Arranged against the washer 10 is a fiber disk 12 provided with a central opening 13 and having two rows of annularly concentrically arranged openings 14. Against the face of the fiber disk 12 is placed a washer 15 having a row of annularly concentrically arranged openings 15' registering with the outer row of openings in the disk 12. Arranged on the washer 15 is a fiber disk 16 having a central opening 17 and a row of annularly arranged openings 18. A washer 19 is placed on the face of the disk 16 and against this washer is placed a plate 20 having a tubular outlet 21 which is connected to the horn in the ordinary manner.

The plate 20 is provided with openings 22 and the washer and fiber disks are provided with openings which register with the openings 22 and through which screws 23 are adapted to extend which are screwed to the threaded bores 24 formed in the sound box 1 and it will be seen that by this construction the disks and washers can be readily assembled and taken apart and as some of the sound boxes now in use are constructed in substantially the same manner as shown composed of a cylindrical sound box 1 and a cover plate 20 I have found that the fiber disks and washers can be placed in position thereon by simply substituting screws of greater length than those employed.

In the construction shown the fiber disks 7, 12 and 16 are spaced apart by washers 10, 15 and 19 in order to provide chambers 24, 25, 26 and 27 between the mica diaphragm and the plate 20. In assembling these disks and washers the washers are preferably pasted to the fiber disk so that they can be readily assembled and while I have only shown two screws for holding the members together, it is of course understood that any number can be employed. Each fiber disk is provided with a central opening and one or more rows of openings, the fiber disk in proximity to the mica diaphragm being provided with three rows of openings, the next fiber disk with two rows and the next with one row of openings, these openings being in alinement as clearly shown. The vibrations produced by the mica diaphragm are the strongest at the center and have a free exit through the center openings of the fiber disk, the central waves pass freely through these center openings and the waves farther from the center pass through the openings of the fiber disk and mix with the central waves which are in motion with less force as a volume, the balance of the waves passing through the outer openings whereby the sound waves produced are broken up so as to eliminate the harshness of the ordinary sound box now in use. The path of travel of the sound waves is clearly shown in Fig. 2 of the drawing and I have found that in the construction of sound box as herein shown and described the sound waves are broken up by passing through the various openings and mingling with the waves passing through the central opening and as the sound box is provided with a series of chambers in which these sound waves pass in their path of travel to the outlet, I am able to produce a sound box in which the disadvantages now existing are entirely eliminated.

What I claim is:—

1. A sound box for sound reproducing machines having a vibratory diaphragm at one end and a centrally disposed outlet at its other end, a series of spaced fiber disks disposed in said box, each having a central opening, said disks being provided with annularly arranged openings, the disk in proximity to the vibratory diaphragm being provided with a series of annularly arranged openings.

2. A sound box for sound reproducing machines comprising a cylindrical sound box having a vibratory diaphragm at one end and a plate at its opposite end provided with a centrally disposed outlet, a plurality of fiber disks arranged in spaced relation within said sound box, each of said disks being provided with a central opening and a row of annularly arranged openings, the disk in proximity to the vibratory diaphragm being provided with a series of annularly arranged openings.

3. A sound box having a diaphragm at one end and an outlet at its other end, a series of flat apertured fiber disks arranged within said box and spaced apart, said disks having annularly arranged openings gradually decreasing in number from the vibratory diaphragm toward the outlet.

4. A sound box for sound reproducing machines comprising a cylindrical casing having one of its ends closed by a vibratory diaphragm, a plurality of fiber disks spaced apart by washers arranged against said box, a plate arranged against the washer carried by the outer disk having a central outlet opening, screws passing through said plate, disk and washer for securing the same to the box, said disk being provided with central openings and annularly arranged apertures.

5. A sound box having a diaphragm at one end and an outlet at its other end, a series of disks arranged within said box and spaced apart, said disks having registering openings gradually decreasing in number from the vibratory diaphragm toward the outlet.

In testimony whereof I have hereunto affixed my signature in the presence of two witnesses.

WASHINGTON C. KANTNER.

Witnesses:
HARRY F. KANTNER,
B. W. HOMAN.